Dec. 9, 1930.  A. PEARSON  1,784,108

GARDEN TOOL

Filed July 18, 1928

Inventor
Alfred Pearson
By Chindahl Parker Carlson
Atty.

Patented Dec. 9, 1930

1,784,108

UNITED STATES PATENT OFFICE

ALFRED PEARSON, OF ROCKFORD, ILLINOIS, ASSIGNOR OF ONE-HALF TO FRANK A. FREED, OF ROCKFORD, ILLINOIS

GARDEN TOOL

Application filed July 18, 1928. Serial No. 293,754.

This invention relates to improvements in garden tools and more particularly to a combination implement having a plurality of tools such as a spud or spade, and a fork or rake carried by a single handle.

The principal object of the invention is to provide a means of novel construction for mounting a plurality of tools on the handle of a garden implement for adjustment into different angular positions.

An important object of the invention is to provide a new and improved implement of the above character in which locking and unlocking of the handle and the tools in different angular relations may be effected by bodily movement of the tool longitudinally of the handle.

Still another object of the invention is the provision of a combination garden tool of durable and substantial construction which can be manufactured largely from stampings and which will not be subject to clogging with dirt.

Further objects and advantages of the invention will be understood from the following detailed description taken in connection with the accompanying drawings in which.

Figure 1:
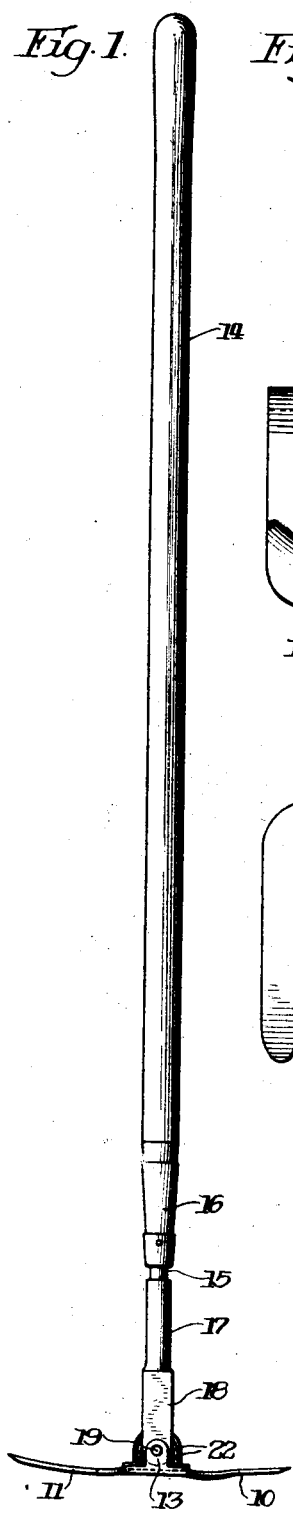
Fig. 1 is a side view of the garden tool constructed in accordance with this invention and with the implement in position to be used either as a rake or hoe.
Figure 2:
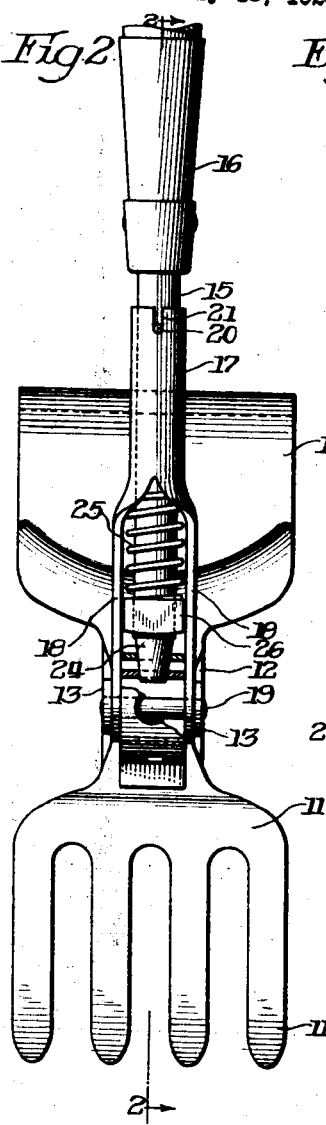
Fig. 2 is a fragmentary side view of the implement in position to be used as a fork.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In its exemplary form shown in the drawings, the tools of the implement comprise a spud or spade 10, and a rake or fork 11, formed integrally with an intermediate body 12. Preferably the tools are stamped from a single piece of sheet metal, two ears 13 being formed integral with and at the sides of the body and bent into spaced parallel relation.

The tools thus constructed are pivotally mounted on one end of an elongated handle 14 which for this purpose carries a shank 15 secured to the handle by ferrule 16. Slidably mounted on the shank 15 is a sleeve 17 which is split apart at its lower end to form a yoke having two flat parallel arms 18 the ends of which are received between the ears 13 and pivotally connected thereto by a pin 19. Thus the tools are mounted to swing into different angular positions with respect to the handle and for bodily movement longitudinally of the handle by reciprocation of the sleeve 17 along the shank 15. Rotation of the sleeve 17 about the shank is prevented by a pin 20 carried by the shank and working in a guide notch 21 formed in and extending longitudinally of the sleeve 17.

Figure 3:
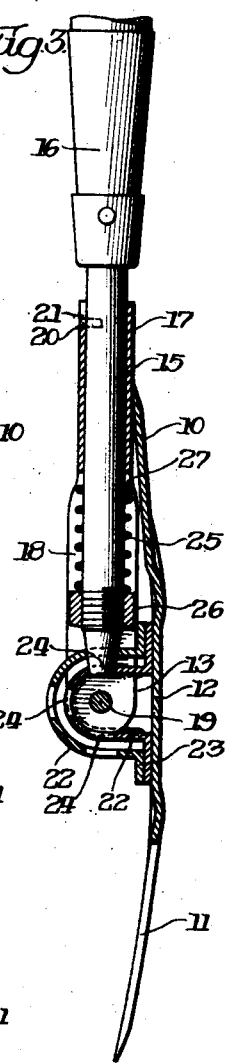
Fig. 3 is a sectional view of Fig. 2 taken substantially along the line 2—2.

To secure the implement firmly in different positions of angular adjustment so that the different tools may be used for different purposes, a locking means is provided including a boss formed by two spaced concentric straps 22 secured to the intermediate body of the implement between the ears 13 as by welding their outwardly bent ends 23 to each other and to the body 12. Preferably the straps are of arcuate form with their axes substantially coincident with the pivot pin 19. Alined holes 24 are punched in the straps 22 to form a plurality of radially extending recesses for receiving the truncated conical end of the shank 15. When the shank engages the recess as shown in Fig. 3, the tools are positively locked to the handle to permit use of the implement as a fork. With the shank entered in the opposite recess, the implement constitutes a spade while a hoe and a rake are formed when the shank is entered in the intermediate recess as shown in Fig. 1.

To maintain locking engagement between the straps 22 and the shank when the latter is entered in to any of the recesses, a coiled spring 25 is mounted on the shank 15 within the spaced arms 18 of the yoke and acts in compression between a nut 26 and a shoulder 27 formed at the junction of the sleeve 17 and the arms 18. The nut is threaded onto the shank 17 so that the force exerted by the spring may be varied as desired. The sides of the nut engage and are guided by the inner surfaces of the yoke arms 18, a fixed relation being thereby maintained between the yoke and that portion of the shank which projects beyond the sleeve. When it is desired to change the adjustment of the tool relative to the handle, the user of the implement may conveniently overcome the spring and withdraw the shank by pressing the tool against the ground with his foot, thereafter exerting an upward pull on the handle. Locking of the tool in the new position of adjustment takes place automatically when the tool has been swung about the handle so that the end of the shank 15 registers with the proper holes in the straps 22.

It will be seen that the implement thus provided is light, durable, and extremely rugged in construction and economical to manufacture. It is not subject to an inherent defect of prior devices of this character, namely, a tendency to become clogged with dirt which would render the adjusting means wholly or partially inoperative. Thus dirt which collects in the apertures of the external strap 22 will be forced into the relatively large space between the external and internal strap from where it is free to fall from the tool. The arcuate shaped space defined by the inner strap 22 is adapted to receive such dirt as may be forced by the end of the shank 15 through the inner apertures 24.

I claim as my invention:

1. An implement comprising, in combination, a tool having spaced ears intermediate its ends and substantially parallel to its axis, a handle, a sleeve reciprocable on said handle, one end of said sleeve being split to form a yoke, a pin pivotally securing said yoke to said ears, a shoulder on said sleeve, a nut on said handle, a compression spring on said handle between said yoke and nut to urge said handle toward said tool, two spaced concentric straps on said implement axially coincident with said ears, said straps having radially alined holes to receive the end of said handle to lock said tool in angular relation to said handle.

2. An agricultural implement of the character described comprising, in combination, a member having a ground working tool thereon, a hollow arcuate boss on said member, said boss having a plurality of apertures formed therein in angularly spaced relation, a yoke pivotally connected to said member, a sleeve rigid with said yoke, a handle having one end reciprocable in said sleeve, a shoulder formed on the yoke adjacent the sleeve, a nut carried by said handle and spaced from the end thereof, and spring means acting between said shoulder and said nut tending to protrude said end through any one of said apertures and thereby lock said handle in predetermined angular position with respect to said member.

3. An implement of the character described comprising, in combination, a handle, a member slidable longitudinally on said handle, a tool pivotally connected to said member, strap means spaced from said tool providing a plurality of apertures angularly spaced about the pivotal axis of the tool, a shank rigid with said handle for entering any one of said apertures to lock said tool in predetermined angular position relative to said handle, and a spring tending to effect movement of said member relative to said handle to hold said shank in the selected aperture, said last mentioned action automatically forcing accumulated dirt from said aperture.

4. An agricultural implement comprising, in combination, a tool, a handle, a sleeve relatively reciprocable on said handle and having a bifurcated end pivoted to said tool, stop means on said sleeve, stop means on said handle, and a spring on said handle acting between said respective stop means to urge said handle towards said tool, spaced concentric straps on said tool being formed with a plurality of peripherally spaced sets of radially aligned apertures adapted selectively to receive the end of said handle to rigidly secure said handle in adjusted angular relation to said tool.

5. An agricultural implement comprising, in combination, a tool, a handle, a sleeve relatively reciprocable on said handle and having a bifurcated end pivoted to said tool, spring means to urge said handle towards said tool, and a hollow arcuate member having a plurality of peripherally spaced apertures opening into the interior thereof and adapted selectively to coact with said handle to secure the latter rigidly in any one of a plurality of positions relative to said tool, the end of said handle being adapted to project through any one of said apertures into said hollow member when in operative position.

In testimony whereof, I have hereunto affixed my signature.

ALFRED PEARSON.